(12) United States Patent
Arimilli et al.

(10) Patent No.: US 7,586,936 B2
(45) Date of Patent: Sep. 8, 2009

(54) HOST ETHERNET ADAPTER FOR NETWORKING OFFLOAD IN SERVER ENVIRONMENT

(75) Inventors: Ravi Kumar Arimilli, Austin, TX (US); Claude Basso, Raleigh, NC (US); Jean Louis Calvignac, Raleigh, NC (US); Chih-Jen Chang, Apex, NC (US); Philippe Damon, Raleigh, NC (US); Ronald Edward Fuhs, Rochester, MN (US); Satya Prakash Sharma, Austin, TX (US); Natarajan Vaidhyanathan, Carrboro, NC (US); Fabrice Jean Verplanken, La Gaude (FR); Colin Beaton Verrilli, Apex, NC (US); Scott Michael Willenborg, Stewartville, MN (US)

(73) Assignee: International Business Machines Corporation, Armonk, NY (US)

( * ) Notice: Subject to any disclaimer, the term of this patent is extended or adjusted under 35 U.S.C. 154(b) by 518 days.

(21) Appl. No.: 11/097,608

(22) Filed: Apr. 1, 2005

(65) Prior Publication Data
US 2006/0251120 A1 Nov. 9, 2006

(51) Int. Cl.
*H04L 12/66* (2006.01)
(52) U.S. Cl. ...................................... 370/463; 370/536
(58) Field of Classification Search ................. 370/419, 370/428, 466, 463, 469, 535, 537, 536, 542; 709/223, 249; 710/22
See application file for complete search history.

(56) References Cited

U.S. PATENT DOCUMENTS

| 5,058,110 A | 10/1991 | Beach et al. |
| 5,430,842 A | 7/1995 | Thompson et al. |
| 5,442,802 A | 8/1995 | Brent et al. |
| 5,752,078 A | 5/1998 | Delp et al. |
| 5,983,274 A | 11/1999 | Hyder et al. |
| 6,400,730 B1 | 6/2002 | Latif et al. |
| 6,427,169 B1 | 7/2002 | Elzur |

(Continued)

FOREIGN PATENT DOCUMENTS

WO 03049488 A1 6/2003

OTHER PUBLICATIONS

Kung, H.T., Gigabit Local Area Networks: A System Perspective, Apr. 1992, IEE Communications Magazine, vol. 30, Issue 4, pp. 79-89.

(Continued)

*Primary Examiner*—Kwang B Yao
*Assistant Examiner*—Syed Bokhari
(74) *Attorney, Agent, or Firm*—Sawyer Law Group P.C.

(57) ABSTRACT

An Ethernet adapter is disclosed. The Ethernet adapter comprises a plurality of layers for allowing the adapter to receive and transmit packets from and to a processor. The plurality of layers include a demultiplexing mechanism to allow for partitioning of the processor. A Host Ethernet Adapter (HEA) is an integrated Ethernet adapter providing a new approach to Ethernet and TCP acceleration. A set of TCP/IP acceleration features have been introduced in a toolkit approach: Servers TCP/IP stacks use these accelerators when and as required. The interface between the server and the network interface controller has been streamlined by bypassing the PCI bus. The HEA supports network virtualization. The HEA can be shared by multiple OSs providing the essential isolation and protection without affecting its performance.

15 Claims, 16 Drawing Sheets

U.S. PATENT DOCUMENTS

| | | |
|---|---|---|
| 6,510,552 B1 | 1/2003 | Michel et al. |
| 6,650,640 B1 | 11/2003 | Muller et al. |
| 6,658,002 B1 | 12/2003 | Ross et al. |
| 6,678,746 B1 | 1/2004 | Russell et al. |
| 6,724,769 B1 | 4/2004 | Sang |
| 6,728,929 B1 | 4/2004 | Luong |
| 6,735,670 B1 | 5/2004 | Bronstein et al. |
| 6,751,229 B1* | 6/2004 | Waller et al. .............. 370/419 |
| 6,754,662 B1 | 6/2004 | Li |
| 6,788,697 B1 | 9/2004 | Aweya et al. |
| 6,822,968 B1* | 11/2004 | Lim .......................... 370/419 |
| 6,937,574 B1 | 8/2005 | Delaney et al. |
| 6,954,463 B1 | 10/2005 | Ma et al. |
| 6,970,419 B1 | 11/2005 | Kalkunte |
| 6,976,205 B1 | 12/2005 | Ziai et al. |
| 6,988,235 B2 | 1/2006 | Brown |
| 7,023,811 B2 | 4/2006 | Pinto |
| 7,031,304 B1 | 4/2006 | Arberg et al. |
| 7,062,570 B2 | 6/2006 | Hong et al. |
| 7,098,685 B1 | 8/2006 | Agrawal et al. |
| 7,124,198 B2 | 10/2006 | Pinkerton |
| 7,131,140 B1 | 10/2006 | O'Rourke et al. |
| 7,134,796 B2 | 11/2006 | Anderson |
| 7,164,678 B2 | 1/2007 | Connor |
| 7,218,632 B1 | 5/2007 | Bechtolsheim et al. |
| 7,251,704 B2 | 7/2007 | Solomon |
| 7,260,120 B2* | 8/2007 | Kang et al. ................ 370/535 |
| 7,269,661 B2 | 9/2007 | Ree et al. |
| 7,271,706 B2 | 9/2007 | Lee et al. |
| 7,274,706 B1* | 9/2007 | Nguyen et al. ............. 370/419 |
| 7,283,528 B1 | 10/2007 | Lim et al. |
| 7,286,557 B2 | 10/2007 | Feuerstraeter et al. |
| 7,292,586 B2 | 11/2007 | Dewan et al. |
| 7,292,591 B2 | 11/2007 | Parker et al. |
| 7,295,553 B2 | 11/2007 | Saitoh |
| 7,298,761 B2 | 11/2007 | Hong |
| 7,308,006 B1* | 12/2007 | Banerjee et al. ............ 370/535 |
| 2001/0027496 A1 | 10/2001 | Boucher et al. |
| 2003/0026252 A1 | 2/2003 | Thunquest et al. |
| 2003/0088689 A1 | 5/2003 | Alexander et al. |
| 2003/0103499 A1 | 6/2003 | Davis et al. |
| 2003/0154399 A1 | 8/2003 | Zuk et al. |
| 2004/0022094 A1 | 2/2004 | Radhakrishnan et al. |
| 2004/0030766 A1* | 2/2004 | Witkowski .................. 709/223 |
| 2004/0064590 A1 | 4/2004 | Starr et al. |
| 2004/0081145 A1 | 4/2004 | Harrekilde-Petersen et al. |
| 2004/0100952 A1 | 5/2004 | Boucher et al. |
| 2004/0109465 A1* | 6/2004 | Kim et al. .................... 370/419 |
| 2004/0128398 A1* | 7/2004 | Pettey ......................... 709/249 |
| 2004/0218623 A1 | 11/2004 | Goldenberg et al. |
| 2005/0022017 A1 | 1/2005 | Maufer et al. |
| 2005/0076136 A1 | 4/2005 | Cho et al. |
| 2005/0089031 A1 | 4/2005 | Krueger |
| 2005/0108611 A1 | 5/2005 | Vogt |
| 2005/0114663 A1 | 5/2005 | Cornell et al. |
| 2005/0120160 A1 | 6/2005 | Plouffe et al. |
| 2005/0149677 A1 | 7/2005 | Shimada et al. |
| 2005/0256975 A1 | 11/2005 | Kaniz et al. |
| 2006/0031600 A1* | 2/2006 | Ellis et al. ..................... 710/22 |
| 2006/0120289 A1* | 6/2006 | Cunningham ............... 370/235 |
| 2006/0187928 A1 | 8/2006 | McGee et al. |
| 2006/0216958 A1 | 9/2006 | Yee et al. |

OTHER PUBLICATIONS

Cunningham, D.G., The Status of the 10-Gigabit Ethernet Standard, 2001, 27th European Conference on Optical Communication, 2001. ECOC '01, vol. 3, pp. 364-367.

IP Com, Reusing a 10Gbps Ethernet Media Access Controller for a 1Gpbs/100Mbps Ethernet, located at www.ip.com, IP.com No. IPCOM000133402D, Jan. 25, 2006, 6 pages.

Adolf, Geier, Patent Cooperation Treaty: PCT Notification of transmittal of the International Preliminary Report on Patentability (PCT Rule 71.1), European Patent Office, Apr. 13, 2007, 7 pages.

Rummery, Audrey, Patent Cooperation Treaty: PCT Notification of Transmittal of the International Search Report and the Written Opinion of the International Searching Authority, or the Declaration (PCT Rule 44.1), European Patent Office, Jul. 5, 2006, 11 pages.

Braden, Computing the Internet Checksum, RFC 1071, Sep. 1988.

Rijsinghani, Computing the Internet Checksum via Incremental Update, RFC 1624, May 1994.

Touch, Implementing the Internet Checksum in Hardware, RFC 1936, Apr. 1996.

Mazzucco, The Fundamentals of Cache, SystemLogic.Net, Oct. 17, 2000.

Balena, F. "Speed up searched with hash tables," Nov. 13, 2001, DevX.com all pages.

* cited by examiner

HOST ETHERNET ADAPTER FOR NETWORKING OFFLOAD IN SERVER ENVIRONMENT

FIELD OF THE INVENTION

The present invention relates generally to a server environment and more specifically to adapters utilized in such an environment.

CROSS-REFERENCE TO RELATED APPLICATIONS

The present application is related to the following copending U.S. patent applications:

U.S. patent application, Ser. No. 10/096,363, entitled "Method and System for Accommodating Several Ethernet Ports and a Wrap Transmitted Flow Handled by a Simplified Frame-By-Frame Upper Structure", filed on even date herewith and assigned to the assignee of the present invention.

U.S. patent application, Ser. No. 11/096,571, entitled "Method and Apparatus for Providing a Network Connection Table", filed on even date herewith and assigned to the assignee of the present invention.

U.S. patent application, Ser. No. 11/097,051, entitled "Network Communications for Operating System Partitions", filed on even date herewith and assigned to the assignee of the present invention.

U.S. patent application, Ser. No. 11/097,652, entitled "Configurable Ports for a Host Ethernet Adapter", filed on even date herewith and assigned to the assignee of the present invention.

U.S. patent application, Ser. No. 11/096,365, entitled "System and Method for Parsing, Filtering, and Computing the Checksum in a Host Ethernet Adapter (HEA)", filed on even date herewith and assigned to the assignee of the present invention.

U.S. patent application, Ser. No. 11/096,353, entitled "System and Method for a Method for Reducing Latency in a Host Ethernet Adapter (HEA)", filed on even date herewith and assigned to the assignee of the present invention.

U.S. patent application, Ser. No. 11/097,055, entitled "Method and Apparatus for Blind Checksum and Correction for Network Transmissions", filed on even date herewith and assigned to the assignee of the present invention.

U.S. patent application, Ser. No. 11/096,362, entitled "Method and System for Performing a Packet Header Lookup", filed on even date herewith and assigned to the assignee of the present invention.

U.S. patent application, Ser. No. 11/974,430, entitled "System and Method for Computing a Blind Checksum in a Host Ethernet Adapter (HEA)", filed on even date herewith and assigned to the assignee of the present invention.

BACKGROUND OF THE INVENTION

FIG. 1 illustrates a conventional server system 10. The server system 10 includes a processor 12 which is coupled to a main memory 14. The processor 12 is coupled via its private bus (GX) 16 to systems which include a network interface system 18. The network interface system 18 is in turn coupled to an adapter 20 via a PCI bus 22 or the like. As is well known, the PCI 22 bus has a limited bandwidth which affects the amount of traffic that can flow therethrough.

The internet and its applications have tremendously increased the number of clients' requests a server has to satisfy. Each client's request generates both network and storage I/Os. In addition, the advent of 10 gigabit Ethernet and IP storage makes it possible to consolidate the data center communications on a single backbone infrastructure: Ethernet, TCP/IP.

However, TCP/IP protocol at 10 gigabit speed consumes tremendous processing and memory bandwidth in the mainstream servers, therefore severely limiting server's ability to run applications.

In today's server network interface controllers (NICs) limited offloading of functions such as TCP and IP checksums, Large Send (or TCP Segmentation Offload) is supported. However, these functions are adequate up to 1 G, but do not solve the problem for higher speeds such as 10 G and higher.

It is known to use a TCP offload engine to totally offload the complete TCP/IP protocol stack from the server. However, the TOE's implementation is generally implemented in hardware or in picocode in pico processor architectures which are relatively complex. There are also debugging, problem determination and stack maintainability issues. In addition, there are scability issues when using picocode because picoengines do not follow main processor roadmap. Finally, the offload engines typically introduce new protocols and APIs and thus require changes in applications as well as interoperability issues.

Accordingly, what is needed is a system and method for allowing for high bandwidth data in an Ethernet environment that overcomes the above-identified problems. The present invention addresses such a need.

SUMMARY OF THE INVENTION

An Ethernet adapter is disclosed. The Ethernet adapter comprises a plurality of layers for allowing the adapter to receive and transmit packets from and to a processor. The plurality of layers include a demultiplexing mechanism to allow for partitioning of the processor.

A Host Ethernet Adapter (HEA) is an integrated Ethernet adapter providing a new approach to Ethernet and TCP acceleration. A set of TCP/IP acceleration features have been introduced in a toolkit approach: Servers TCP/IP stacks use these accelerators when and as required. The interface between the server and the network interface controller has been streamlined by bypassing the PCI bus.

The HEA supports network virtualization. The HEA can be shared by multiple OSs providing the essential isolation and protection without affecting its performance.

DETAILED DESCRIPTION

The present generally to a server environment and more specifically to adapters utilized in such an environment. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1:
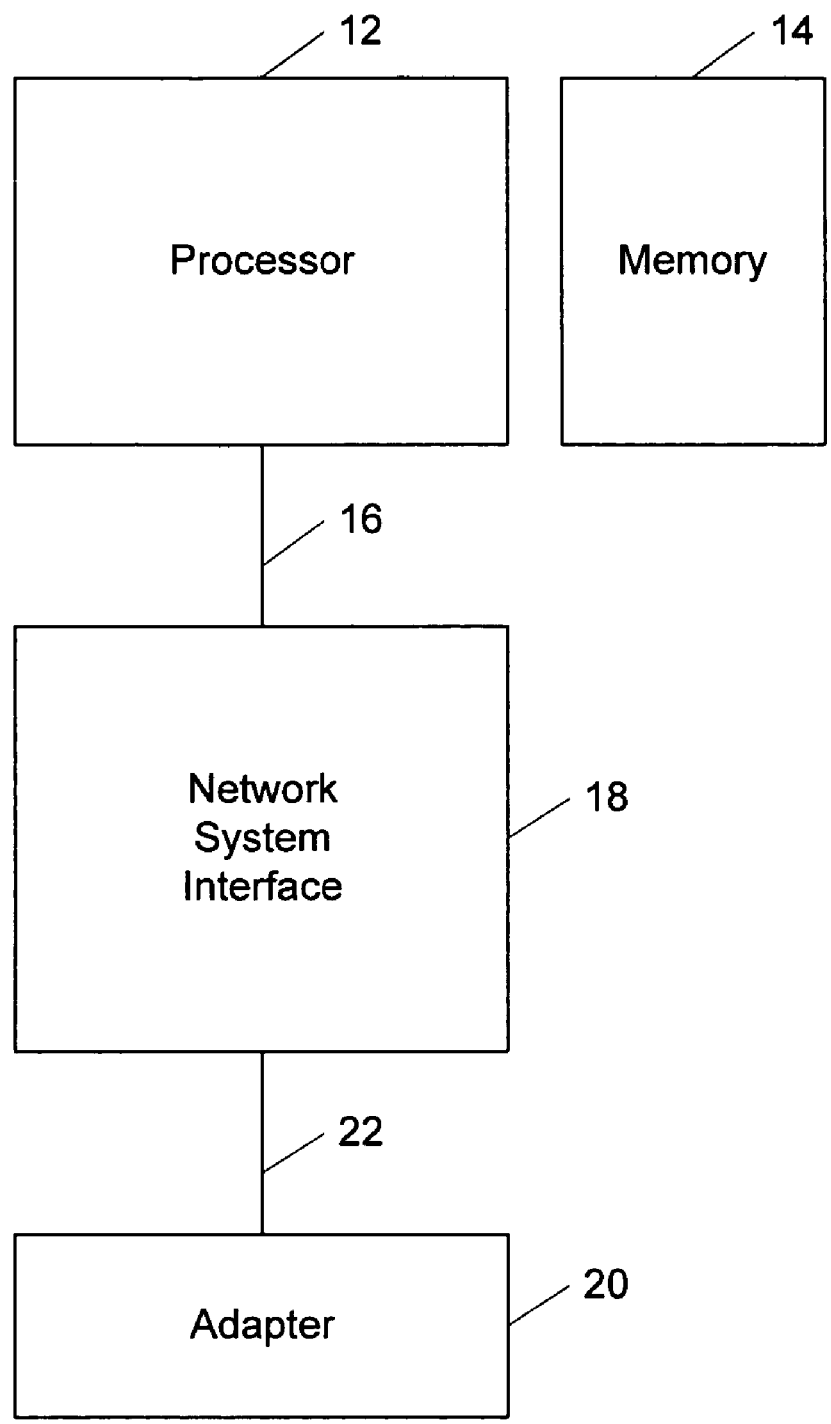
FIG. 1 illustrates a conventional server system.
Figure 2:
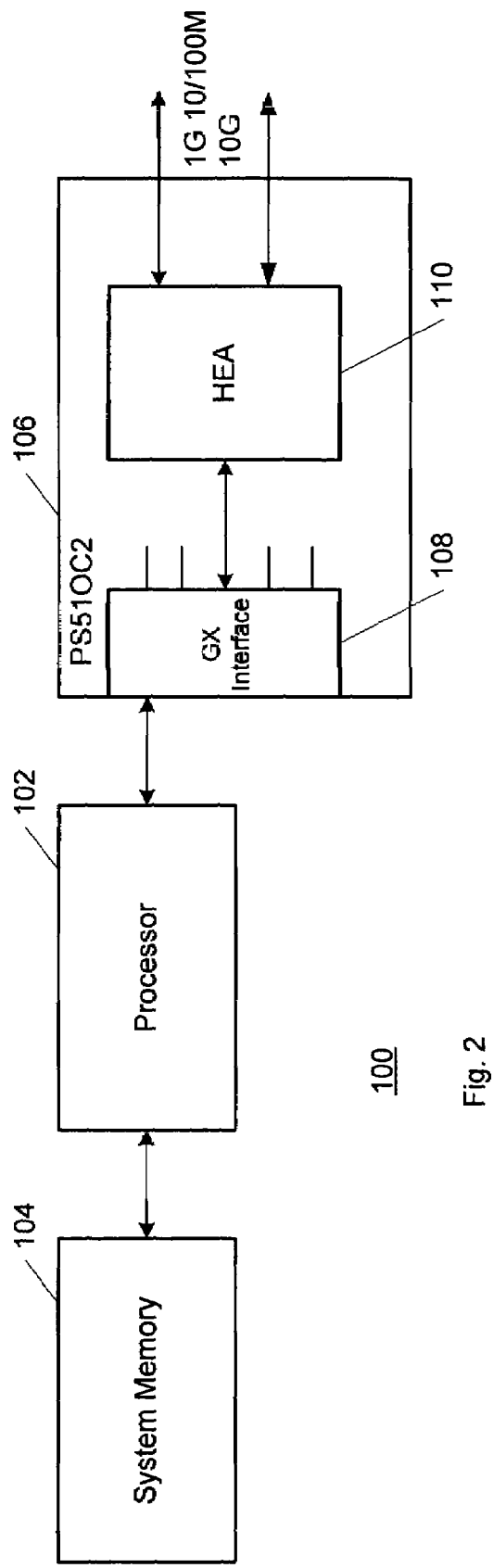
FIG. 2 is a block diagram of a server system in accordance with the present invention.

FIG. 2 is a block diagram of a server system 100 in accordance with the present invention. The server system 100 includes a processor 102 which is coupled between a memory 104 and an interface adapter chip 106. The interface adapter chip 106 includes an interface 108 to the private (Gx) bus of the processor 102 and a Host Ethernet Adapter (HEA) 110. The HEA 110 receives and transmits signals from and to the processor 102.

The HEA 110 is an integrated Ethernet adapter. A set of accelerator features are provided in a TCP/IP stack within the server. The interface 100 between the processor 102 and the interface adapter chip 106 has been streamlined by bypassing the PCI bus and providing interface techniques that enable demultiplexing and multiqueueing and packet header separation.

The HEA 110 achieves unmatched performance level by being directly connected to the GX+ bus and therefore enjoying a tremendous bandwidth (55.42 Gbps at 866 Mhz) to really support the full 40 Gbps bandwidth of two 10 Gbps ports. Note that a 64 bits PCI-X 133 MHz bus is limited to 8.51 Mbps and at least a PCI Express x8 bus is required to match the throughput of two 10 Gbps ports. Being on the GX bus also removes intermediate logic and therefore improves transfer latency.

In so doing an Ethernet adapter is provided that allows for improved functionality with high speed system while allowing for compatibility with legacy server environments. Some of the key features of this improved functionality are described hereinbelow.

Acceleration Functions

The HEA 110 supports advanced acceleration features. One key observation is that the current acceleration functions perform adequately on the transmit side (i.e., transmitting packets from the processor) but are not adequate on the receive side (ie receiving packets via the adapter). The HEA 110 addresses this gap by introducing new features such as Packet Demultiplexing and Multiqueueing, and Header separation.

All of the HEA 110 new features are optional; it is up to the TCP/IP stack to take advantage of them if and when required. For example, a TCP/IP stack can use the HEA 110 and take advantage of the other features of HEA such as throughput, low latency and virtualization support.

Packets Demultiplexing and Multiqueueing

Multiqueueing and Demultiplexing is the key feature to support functions such as virtualization, per connection queueing, and OS bypass. HEA demultiplexing uses the concept of Queue Pairs, Completion Queues and Event Queues. Enhancements have been added to better address OS protocol stacks requirements and short packet latency reduction.

Depending upon system requirements and configuration, HEA can demultiplex incoming packets based on:

Destination MAC address (typically one MAC address and one default queue per partition)

Connection identifier for established connections (Protocol, Source IP address, Destination IP address, Source port, Destination port).

Destination port and optionally destination IP address for TCP connection setup packet (SYN).

Packet Header Separation

The HEA 110 is capable of separating the TCP/IP header from the data payload. This feature allows the header to be directed to the protocol stack for processing without polluting the received buffers posted by the applications.

Enhanced Features

Many enhanced features are provided by the HEA 110 in the server environment. Some of these features are listed below.

1. Multiple Receive Queue: The Queue Pair concept is extended to support more than one receive queue per pair. This enables the stack to better manage its buffer pool memory. For example, one queue can be assigned to small packets, one to medium packets and one to large packets. The HEA 110 will select the ad hoc queue according to the received packet size.

2. Low Latency Queue: On the transmit side a descriptor (WQE) may contain immediate data, in such case no indirection, i.e., no additional DMA from system memory is required to send the data. On the receive side, low latency queues doe not supply buffers but rather receive immediate packet data. The HEA 110 writes directly to the receive queue. Short packets take advantage of this feature leading to a dramatic reduction of DMA operations: one single DMA write per packet as opposed to one DMA read and one DMA write per packet.

3. Receive low latency queues are also used to support the packet header separation: the header is written in the low latency queue while the payload is DMAed to a buffer indicated in the ad-hoc receive queues.

In summary, Demultiplexing and Multiqueueing, and Packet Header Separation are the basic building blocks to virtualization and provide low latency operation. Furthermore, it should be noted that these features can also be used to improve traditional OS protocol stack performance, for example, per-connection queueing allows for the removal of code and more importantly reduces the memory accesses—and associated stalls/cache pollution—consumed to locate the appropriate information in memory.

To describe the features of the HEA 110 in more detail refer now to the following description in conjunction with the accompanying figures.

Figure 3:
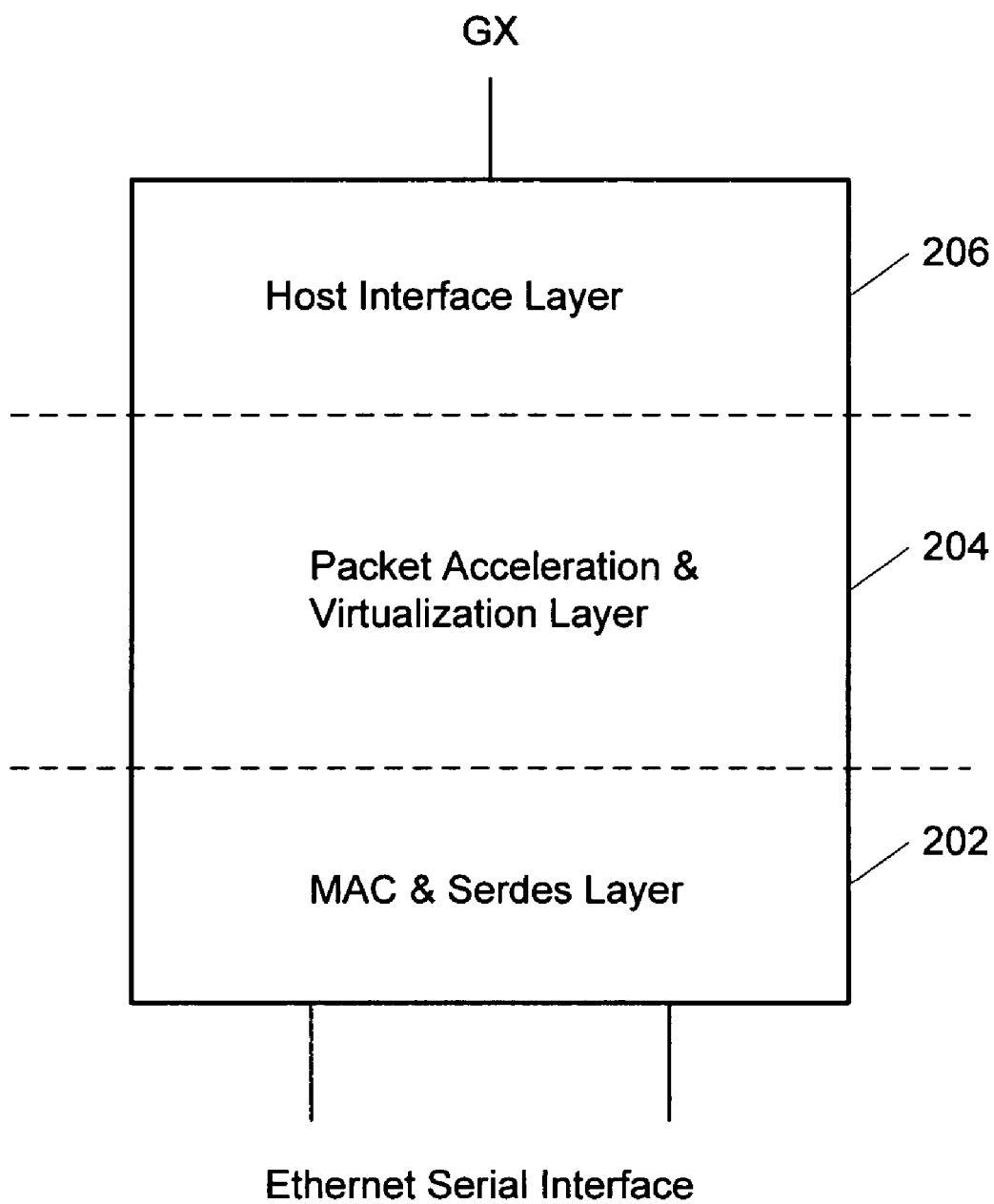
FIG. 3 is a simple block diagram of the HEA in accordance with the present invention.

FIG. 3 is a simple block diagram of the HEA 110 in accordance with the present invention. As is seen, the HEA 110 has a three layer architecture. The first layer comprises a Media Access Controller (MAC) and Serialization/Deserialization (Serdes) layer 202 which provides a plurality of interfaces from and to other devices on the Ethernet network. In the layer 202 the same chip I/Os are used to provide a plurality of interfaces. For example, in a preferred embodiment, the same chip I/Os are utilized to provide either a 10 Gigabit interface or a 1 Gigabit interface.

The second layer comprises a Packet Acceleration and Virtualization Layer 204. The layer 204 provides for receiving packets and demultiplexing the flow of packets for enabling virtualization. The layer 204 enables virtualization or partitioning of the operating system of a server based upon the packets. The layer 204 also provides packet header separation to enable zero copy operations and therefore provide improved latency. Also since layer 204 interacts directly with the private bus (Gx) through the Host Interface Layer 206, a low latency, high bandwidth connection is provided.

The third layer comprises the Host Interface Layer 206. The Host Interface Layer 206 provides the interface to the Gx or private bus of the processor and communicates with layer 204. The layer 206 provides for multiple receive sub-queues per Queue Pair (QP) to enable effective buffer management for a TCP stack. The host layer 206 provides the context management for a given flow of data packets.

To describe the features of each of the layers 202, 204 and 206 of the HEA 100 in more detail refer now to the following discussions in conjunction with the accompanying figures.

MAC and Serdes Layer 202

Figure 4:
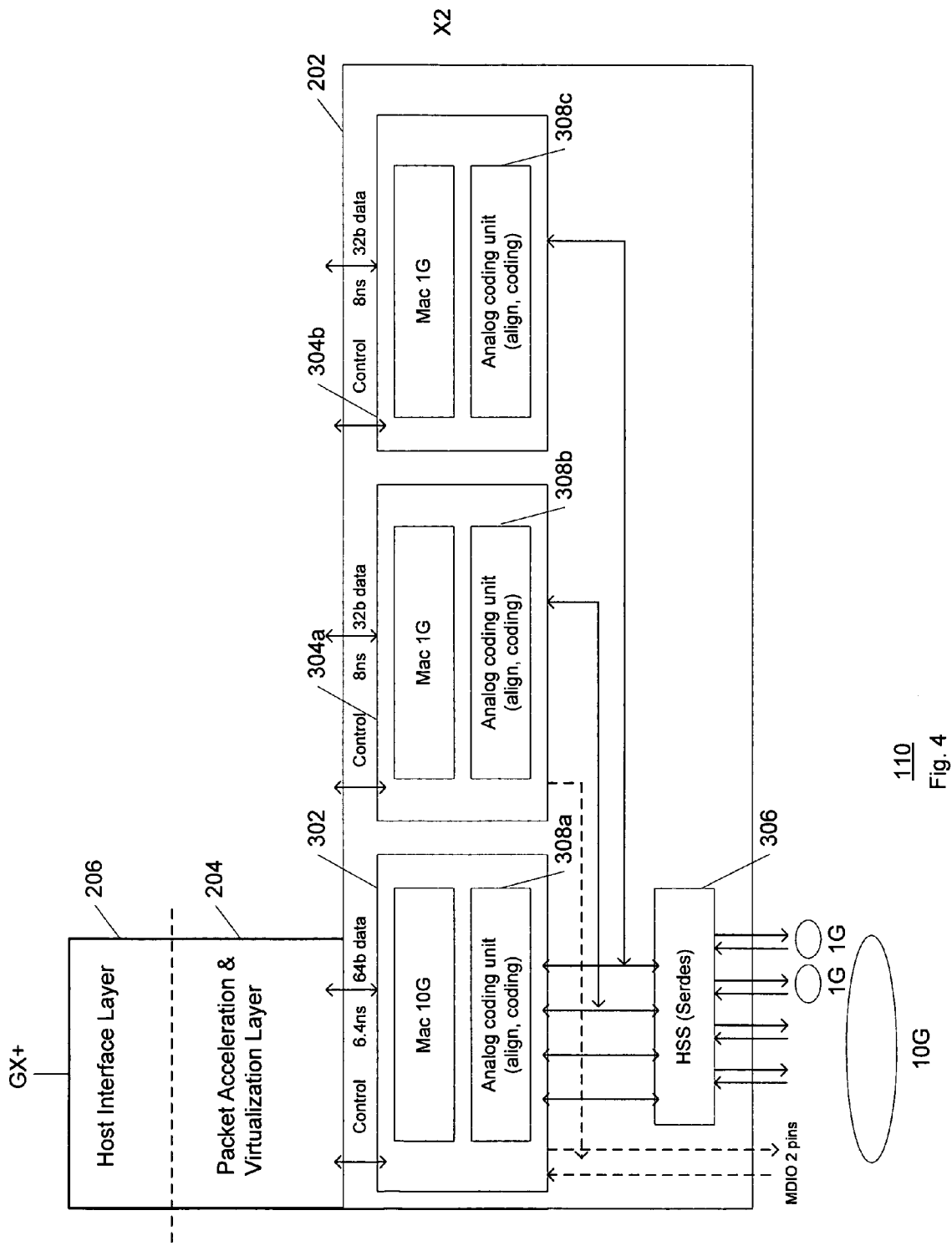
FIG. 4 is a block diagram of the HEA with a more detailed view of the MAC and Serdes Layer.

FIG. 4 is a block diagram of the HEA 110 with a more detailed view of the MAC and Serdes Layer 202. As is seen in this embodiment there is one 10 Gigabit MAC 302 and four 1 Gigabit MACs 304a and 304b. The MACs 302, 304 and 304b include analog coding units 308a, 308b and 308c for aligning and coding the received packets. The MACs 302, 304a and 304b are coupled to a High Speed Serializer/Deserialization (HSS) 306. The high speed serdes 306 is capable of receiving data from one 10 Gigabit source or four 1 Gigabit sources.

Receive Ethernet Function (RxNet) Overview

This section shows the high level structure and flow through the receive Ethernet function within layer 202. The Rx accelerator unit 400 as will be explained in more detail hereinafter is part of Packet Acceleration and Virtualization layer 204.

Figure 5:
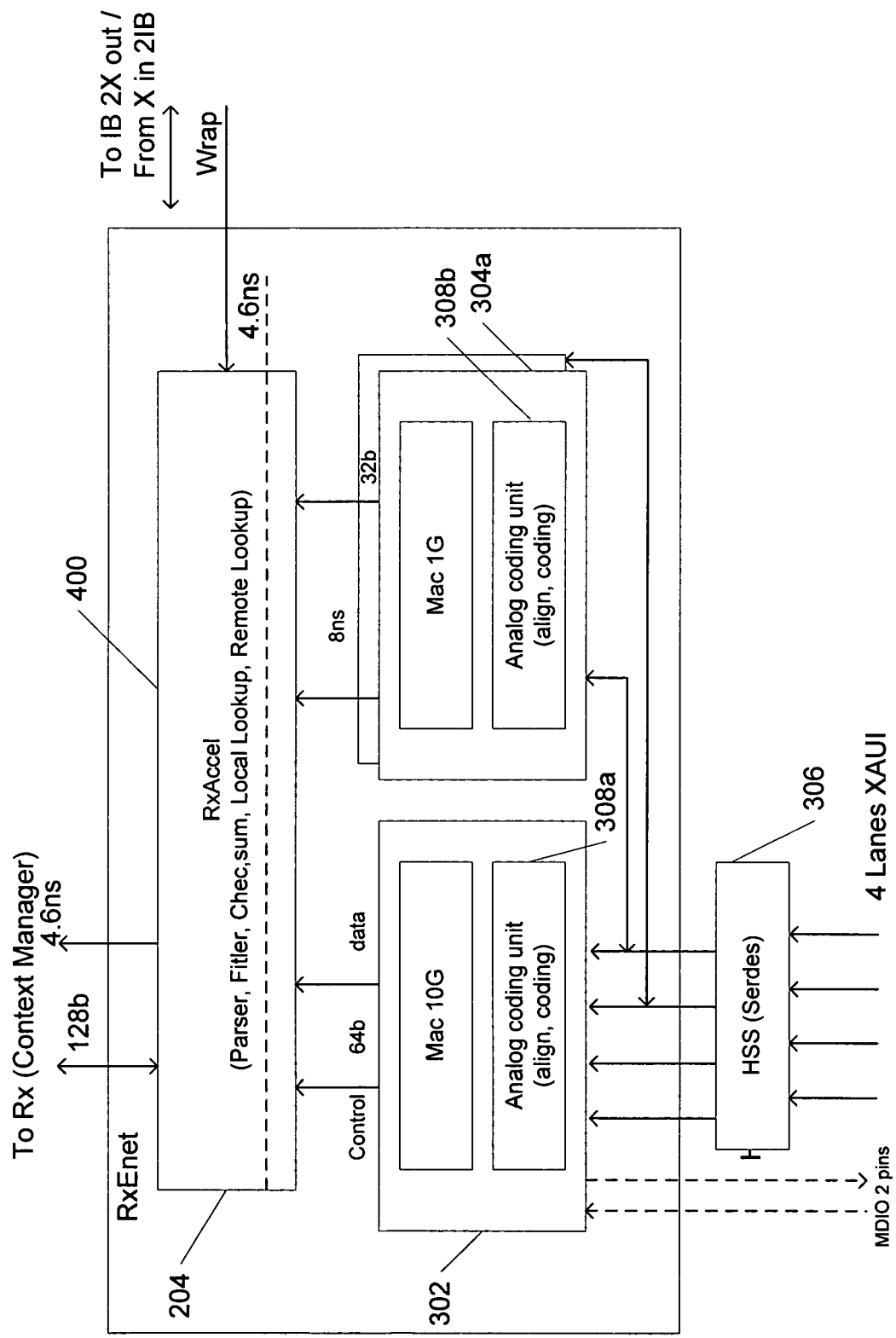
FIG. 5 shows the components and dataflow for one of the RxNet.

FIG. 5 shows the components and dataflow for one of the RxNet. Data arrives on the interface 302 and is processed by the high speed serdes 304, analog coding units 308a and 308b and MAC which assembles and aligns the packet data in this embodiment in a 64 bit (10 G) or 32 bit (1G) parallel data bus. Control signals are also generated which indicate start and end of frame and other packet information. The data and control pass through the RxAccel unit 400 which performs parsing, filtering, checksum and lookup functions in preparation for processing by the Receive Packet Processor (RPP) of the layer 206 (FIG. 2). In this embodiment, the clock is converted to a 4.6 ns clock and the data width is converted to 128b as it enters the RxAccel unit 400.

As data flows through the RxAccel unit 400 to the data buffers within the host layer 206, the RxAccel unit 400 snoops on the control and data and starts its processing. The data flow is delayed in the RxAccel unit 400 such that the results of the RxAccel unit 400 are synchronized with the end of the packet. At this time, the results of the RxAccel unit 400 are passed to a command queue along with some original control information from the MAC 302. This control information is stored along with the data in the buffers.

If the RxAccel unit 400 does not have the lookup entry cached, it may need to go to main memory through the GX bus interface. The GX bus operates at 4.6 ns. The host layer 206 can asynchronously read the queue pair resolution information from the RxAccel unit 400.

Transmit Ethernet Function (TxEnet) Overview

This section provides an overview of the transmit structure and flow through Ethernet and Acceleration functions. The Tx accelerator unit 500 as will be explained in more detail hereinafter is part of Packet Acceleration and Virtualization layer 204.

Figure 6:
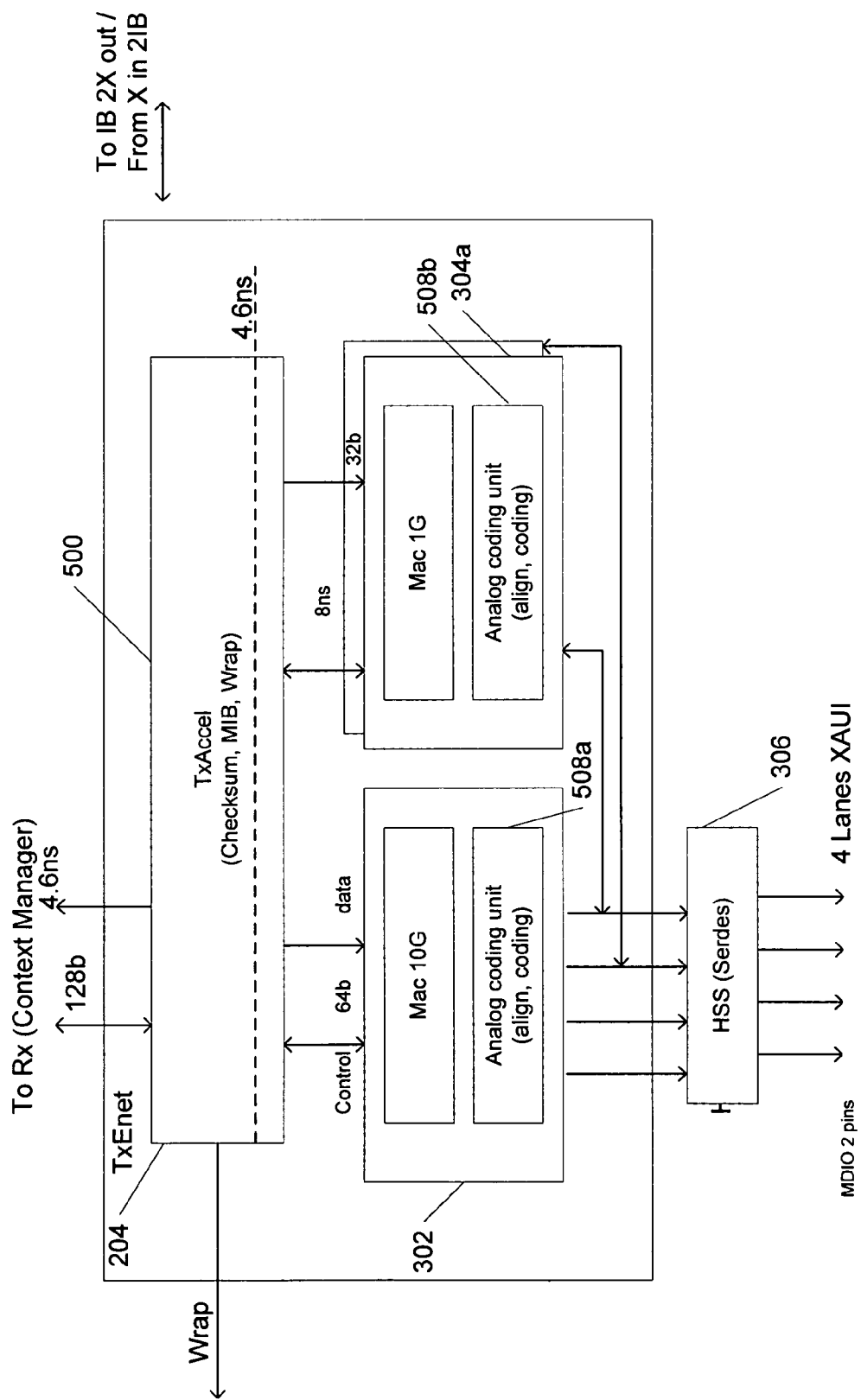
FIG. 6 shows the components and dataflow for one TxEnet.

FIG. 6 shows the components and dataflow for one TxEnet. Packet data and control arrives from the TxAccel 500 component of the HEA 110. The Tx Accelerator (TxAccel) unit 500 interprets the control information and modifies fields in a header of a packet that flows through the unit 500. It makes the wrap versus port decision based on control information or information found in the packet header. It also generates the appropriate controls for the TxMAC 302 and 304. The data flow is delayed in the TxAccel unit 500 such that the TxAccel unit 500 can update packet headers before flowing to the MAC 302 and 304. At the exit, the data width is converted from 128 bits to 64 bits (10 G) or 32 bits (1 G). The data and control pass through a clock conversion function in the TxAccel unit 500 in order to enter the differing clock domain of the MAC 302 and 304. The MAC 302 and 304, analog converters 508a and 508b and high speed serdes 306 format packets for the Ethernet interface.

Packet Acceleration and Virtualization Layer 204

Figure 7:
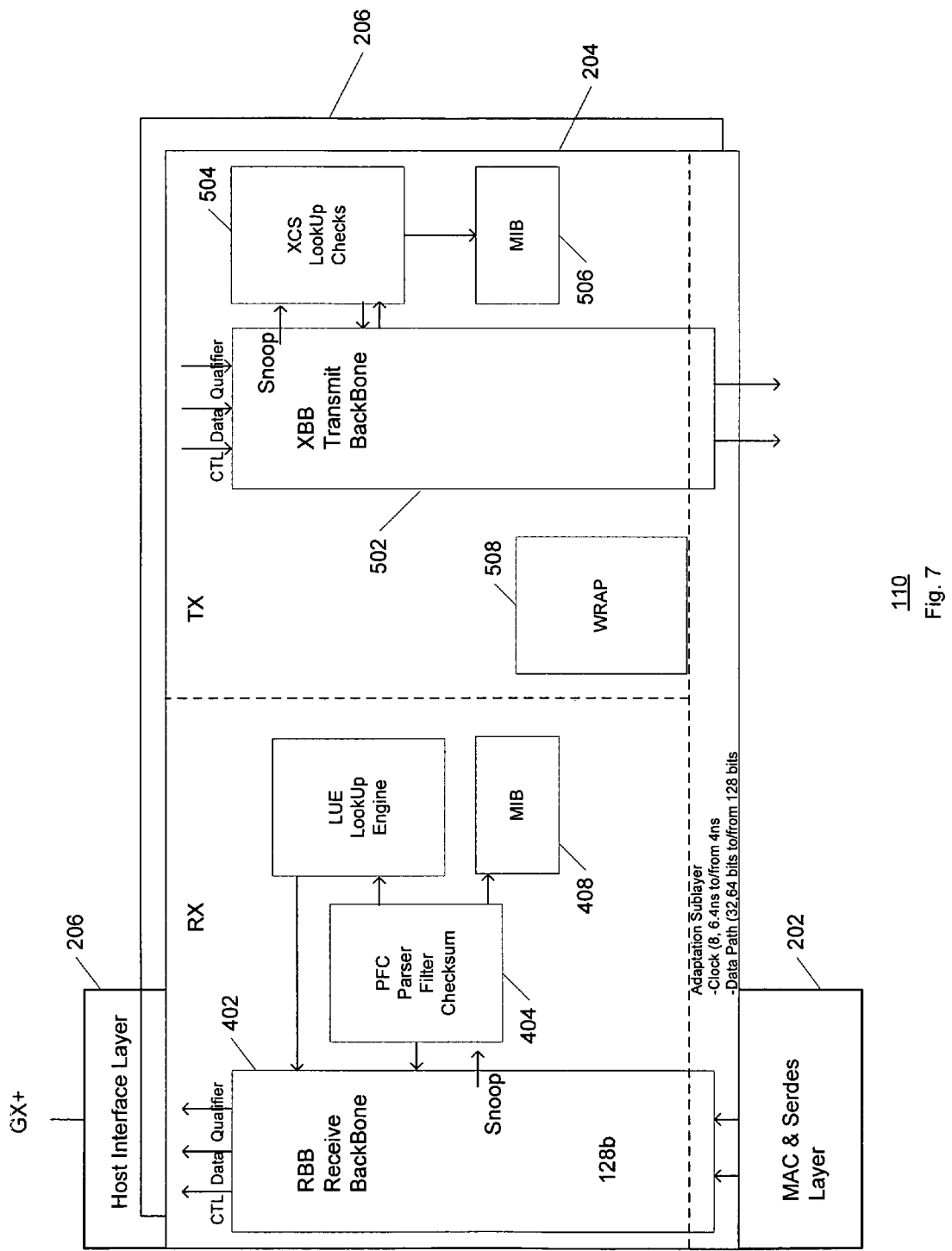
FIG. 7 is a block diagram of the HEA with amore detailed view of the Packet Acceleration and Visualization Layer.

FIG. 7 is a block diagram of the HEA 110 with a more detailed view of the Packet Acceleration and Visualization Layer 204. The HEA Layer 204 comprises the previously mentioned receive (RxAccel) acceleration unit 400 and the transmit acceleration (TxAccel) unit 500. The RxAccel unit 400 comprises a receive backbone (RBB) 402, a parser filter checksum unit (PFC) 404, a lookup engine (LUE) 406 and a MIB database 408. The TxAccel unit 500 comprises the transmit backbone 502, lookup checks 504 and an MIB engine 506. The operation of the Rx acceleration unit 400 and the Tx acceleration unit 500 will be described in more detail hereinbelow.

Receive Acceleration (RxAccel) Unit 400

Figure 8:
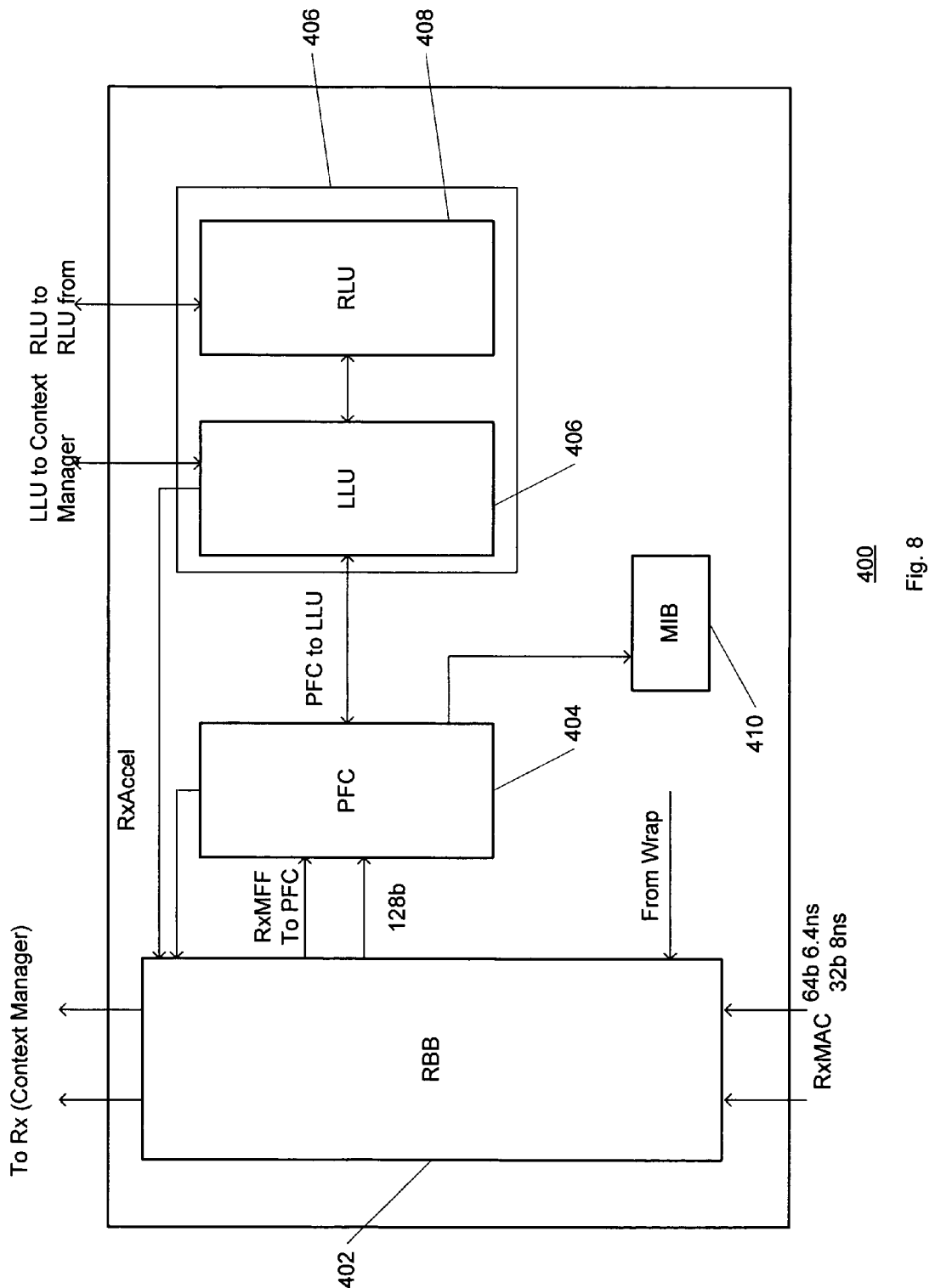
FIG. 8 is a more detailed view of the RxAccel unit.

This section describes the high level structure through the RxAccel unit 400. FIG. 8 is a more detailed view of the RxAccel unit 400. The RxAccel unit 400 includes the Receive Backbone (RBB) 402, the Parser, Filter and Checksum Unit (PFC) 404, the Local Lookup Unit (LLU) 406, the Remote Lookup Unit (RLU) 408 and an MIB database 410.

Data flows through the RxAccel unit 400 from the receive MAC unaltered. The RBB 402 manages the flow of data and is responsible for the clock and data bus width conversion functions. Control and Data received from the receive MAC is used by the PFC 404 to perform acceleration functions and to make a discard decision. The PFC 404 passes control and data extracted from the frame, including the 5-tuple key, to the LLU 406 in order to resolve a Queue Pair number (QPN) for the RBB 402. The LLU 406 either finds the QPN immediately or allocates a cache entry to reserve the slot. If the current key is not in the cache, the LLU 406 searches for the key in main memory. The PFC 404 interfaces to the MIB database 410 to store packet statistics.

Tx Acceleration 500

This section describes the high level structure and flow through the Transmit Acceleration unit 500 (TxAccel).

Figure 9:
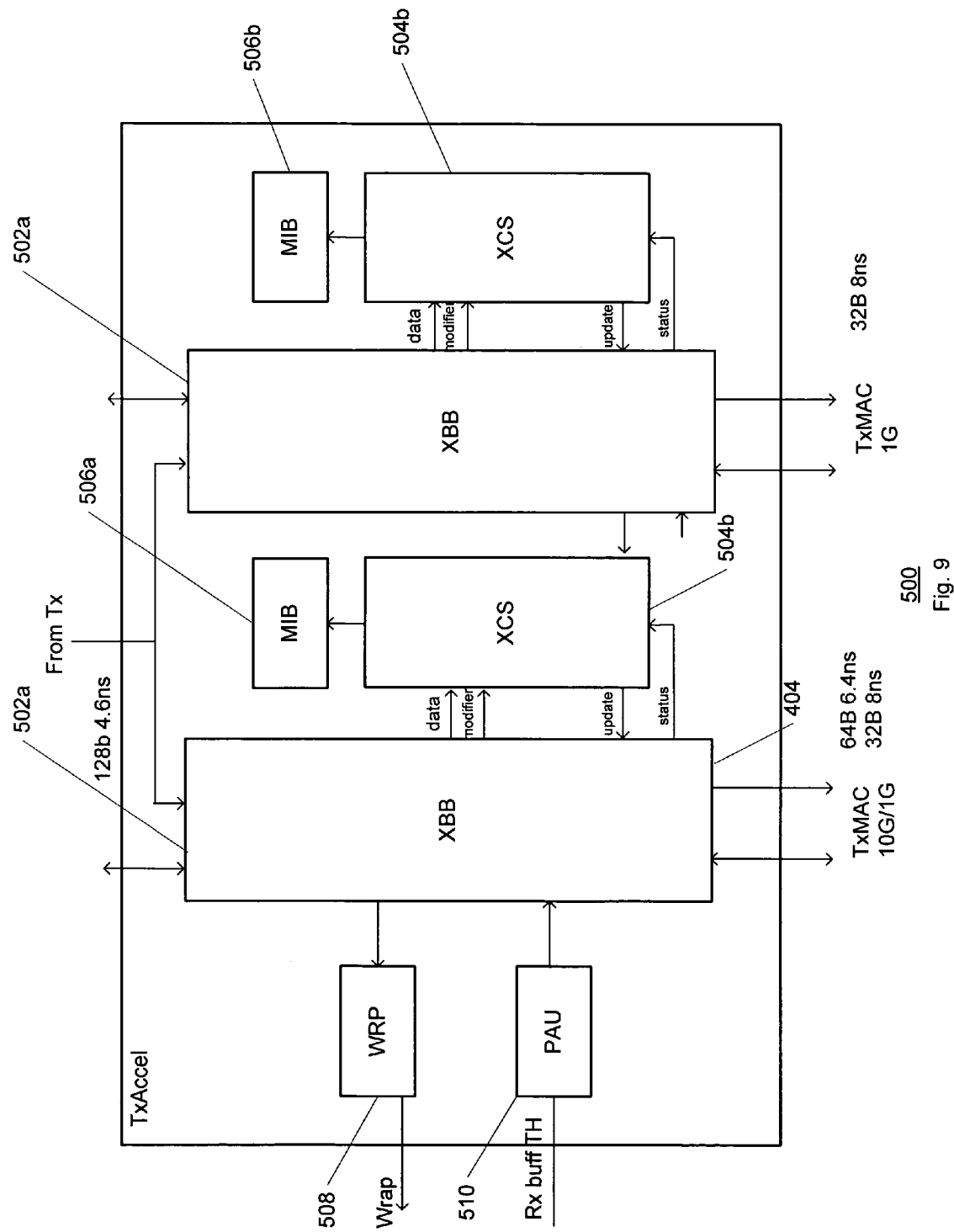
FIG. 9 shows that the RxAccel unit is composed of two Transmit Backbones (XBB), two Transmit Checksum units, two Transmit MIBs, One Wrap Unit and one Pause Unit.

FIG. 9 shows that the TxAccel unit 500 is composed of two Transmit Backbones (XBB) 502a and 502b, two Transmit Checksum units (XCS) 504a and 504b, two Transmit MIBs 506a and 506b, one Wrap Unit (WRP) 508 and one Pause Unit (PAU) logic 510. Data flows through the TxAccel from the ENop and is modified to adjust the IP and TCP checksum fields. The XBB 502a and 502b manages the flow of data and is responsible for the clock and data bus width conversion functions. Control and Data received from the ENop is used by the XCS 504a and 504b to perform checksum functions. After the packet is transmitted (or discarded) by the MAC layer 202, the transmit status returns to the TxAccel for accounting. The XBB 502 transforms the information to the clock domain of the TxAccel unit 500. The status information is merged with original information obtained from the packet by the XCS 504 and passed to the MIB Counter logic 506a and 506b. The MIB logic 506a and 506b updates the appropriate counters in the MIB array. The Wrap Unit (WRP) 508 is responsible for transferring to the receive side packets that the XCSs 504a and 504b have decided to wrap. The Pause Unit (PAU) 510 orders the MAC to transmit pause frames based on the receive buffer's occupancy.

Host Interface Layer 206

Figure 10:
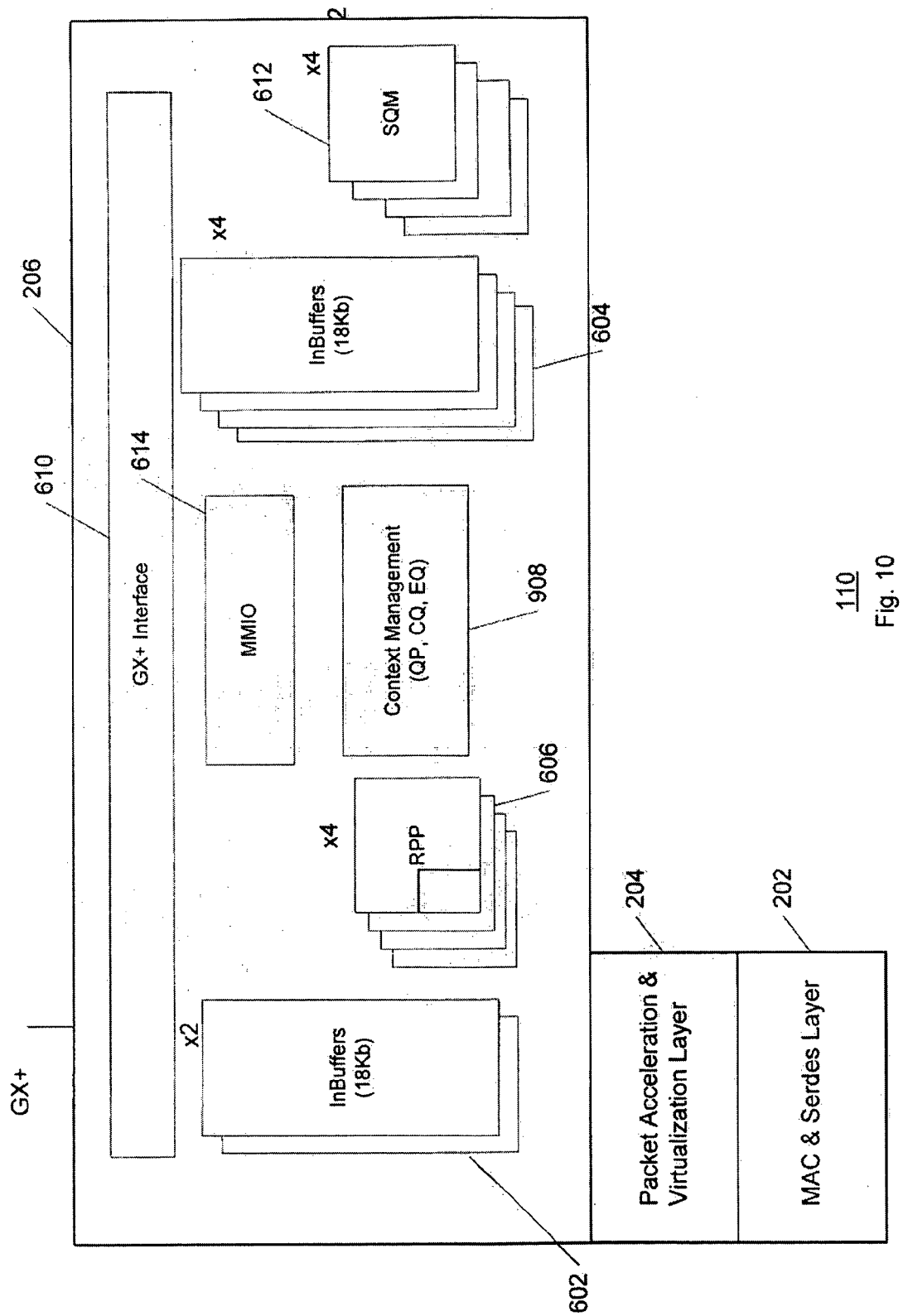
FIG. 10 is a block diagram of the HEA 110 with a more detailed view of the Host Interface Layer.

FIG. 10 is a block diagram of the HEA 110 with a more detailed view of the Host Interface Layer 206. The Host Interface Layer 206 includes input and output buffers 602 and 604 for receiving packets from the layer 204 and providing packets to layer 204. The layer 206 includes a Receive Packet Processor (RPP) 606 for appropriately processing the packets in the input buffer. The context management mechanism 908 provides multiple sub-queues per queue prior to enable effective buffer management for the TCP stack.

Demultiplexing Function

The Rx unit 400 of layer 204 in conjunction with components of the host interface layer 206 demultiplexes the packets to ensure they are provided to the appropriate portion of the processor. Accordingly, the received packets must be demultiplexed to ensure that they flow to the appropriate portion of the server.

To describe the details of this demultiplexing function refer now to the following in conjunction with FIG. 8 and FIG. 9.

Demultiplexing Implementation on the HEA Adapter

Before the Receive Packet Processor (RPP) 606 can work on a received packet, the queue pair context must be retrieved. The QP connection manager does this using a QP number. Since QP numbers are not transported in TCP/IP packets, the number must be must be determined by other means. There are two general classes of QPs, a per-connection QP and a default QP.

Per-connection Queue Pairs (QPs)

Per-connection QP is intended to be used for long-lived connections where fragmentation of the IP packets is not expected and for which low-latency is expected. It requires that the application supports a user-spacing queueing mechanism provided by the HEA 110. In this embodiment the logical port must first be found using the destination MAC address. Three types of lookup exist for per-connection QP:

1. New TCP connections for a particular destination IP address and destination TCP port. A lookup is performed based on the TCP/IP (DA, DP, Logical port) if the packet was a TCP SYN packet.

2. New TCP connections for a particular destination TCP port only (disregarding DA). A lookup is performed based on the TCP/IP (DP, Logical port) if the packet was a TCP SYN packet.

3. Existing TCP/UDP connection. A lookup is performed based on the TCP/IP 5-tuple plus the logical port if the packet was a non-fragmented unicast TCP or UDP packet.

Default Queue Pairs

Default QP are used if no per-connection QP can be found for the packet or if per-connection lookup is not enabled for a MAC address or if the packet is a recirculated multicast/broadcast packet. Generally default QP are handled by the kernel networking stack. These types of default QPs exist in the HEA 110:

1. Default OS queue per logical port. A logical port corresponds to a logical Ethernet interface with its own default queue. Each logical port has a separate port on the logical switch.

A lookup is performed based on MAC address.

A direct index (logical port number) to the default OS queue is provided with recirculated (wrapped) multicast/broadcast packets.

2. Multicast (MC) or Broadcast (BC) queue.

A configured value if the packet is a multicast or broadcast packet which does not match one of the MAC addresses in the MAC lookup table.

3. Super-default Unicast (UC) queue.

If a UC packet does not match one of the configured MAC addresses, a default UC QPN may be used.

This mechanism allows for flexibility between the two extremes of queueing per connection and queueing per logical port (OS queue). Both models can operate together with some connections having their own queueing and some connections being queued with the default logical port queues.

Connection lookup is performed by the RxAccel unit 400. One such unit exists for each port group. Within the RxAccel unit 400, each component performs a portion of the process. The PFC 404 extracts the needed fields from the packet header and determines the logical port number based on the destination MAC address. The Local Lookup Unit (LLU) 406 and Remote Lookup Unit (RLU) 408 are then responsible for resolving the QP number. The LLU 406 attempts to find a QPN using local resources only (cache and registers).

The purpose of the LLU 406 is to attempt to determine the QP number associated with the received packet. The QP number is required by the VLIM and RPP 606. It performs this task locally if possible (i.e. without going to system memory).

The QP number can be found locally in one of several ways:

Lookup in TS cache

Default partition QP

Default UC QP

If no match is found locally, then a preliminary check is made to see if the entry might be in present in system memory. If so, the RLU 408 is invoked to perform the search. If the RLU 408 is busy, a queue of requests can be formed which will be provided to the RLU 408 as it becomes free.

The LLU 406 communicates with the RBB 402 providing the QP number and/or the queue index to use for temporary queueing. If no eligible entries are available in the cache, the LLU 406 indicates to the RBB 402 that the search is busy. The packet must be dropped in this case.

The LLU 406 provides the QPN to the host layer 406 when a queue index resolution is requested and has been resolved. The RLU 408 attempts to find a QPN using system memory tables.

The LLU 406 utilizes a local 64 entry cache in order to find the QPN for TCP/UDP packets. If the entry is found in the cache, the RLU 408 does not need to be invoked. If the entry is not found in the cache, a preliminary check is made in the cache to see if the entry might be in the connection table. The cache is useful for eliminating unnecessary accesses to main memory when there are a few number of configured queues.

If the RLU 408 is invoked, it uses a hash of a 6-tuple (including logical port number) to fetch an 128 byte Direct Table (DT) entry from memory. This DT entry contains up to eight 6-tuple patterns and associated QPN. If a match is found, no further action is required.

When the RLU 408 must be invoked, the QPN can not be determined on the fly as the packet is being placed into the input buffers. In fact the QPN may be determined several packets later. For this reason, the RxAccel unit 400 may either provide a QPN or a queue index to the host layer 206 for packet queueing. If a QPN is provided, then the host layer 206 (unloader) may queue the packet directly for work by the RPP. If a queue index is provided, then the host layer 206 must hold this packet to wait for resolution of the QPN. The QPN is always determined by the time the RPP is dispatched.

Virtualization

Because high speed data paths are likely to be shared by multiple partitions and because high speed Ethernet performance is critical on servers, it is crucial for the HEA to:
Provide adapter sharing between multiple partitions
Allow for native performance, i.e., "as with a dedicated adapter"
Allow for native value-add features, i.e., "as with a dedicated adapter" (Large Send, per connection queueing, . . . )
Allow for isolation between partitions
Provide partitions connectivity
Partitions must be able to communicate transparently, i.e., the same way regardless of whether they are collocated on the same physical server or located on different physical servers connected by a real Ethernet.

Today Ethernet virtualization is supported by switching or routing in the Server partition owning the adapter, this extra hop creates performance bottlenecks (data copy, three drivers driver, . . . ). The HEA 110 is designed to provide direct data and control paths (no extra hop) between the using partitions and the adapter. In other words, the HEA provides each partition with its own "virtual" adapter and "logical" ports. As with HCA, all HEA resources and functions can be allocated/ enabled per partition, the exact same mechanisms are used to provide inter partitions protection and isolation.

Data Path

Figure 11:
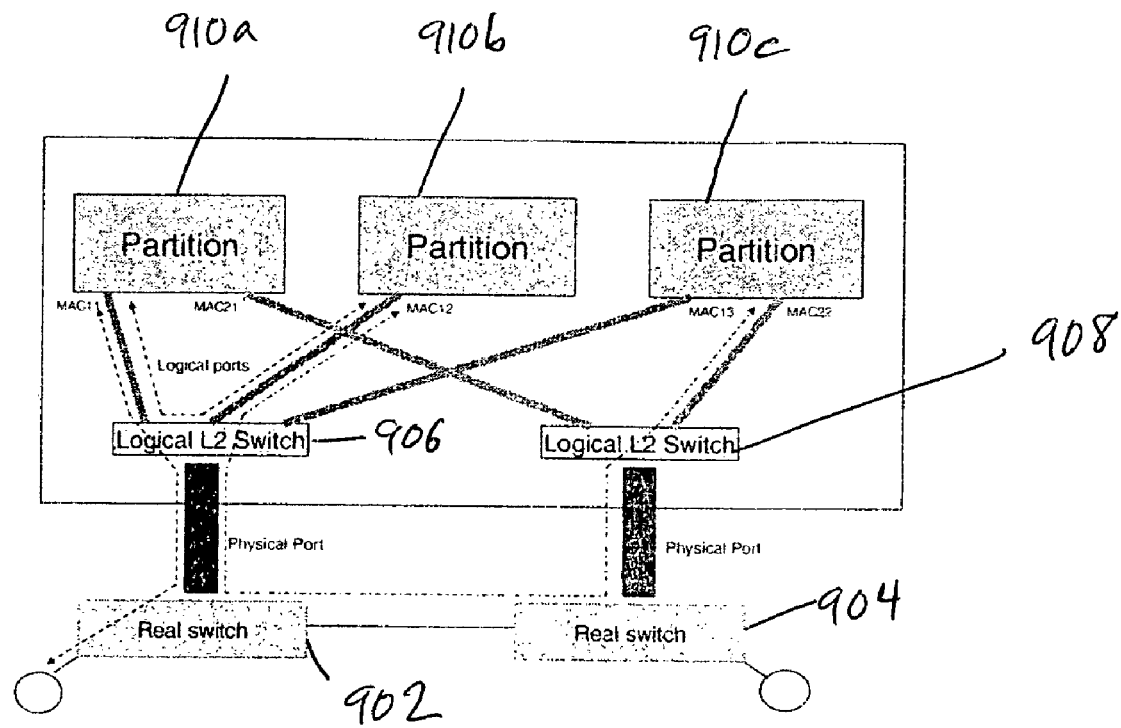
FIG. 11 illustrates the HEA providing a logical layer 2 switch per physical port.

Regarding the data path, as shown in FIG. 11, the HEA 110 provides a logical layer 2 switch 906 and 908 per physical port 902 and 904 in order to provide multicast handling and partition to partition 910a-910c communication. Implementing this support within the HEA keeps the overall system solution simple (In particular, transparency for software) and provides high performance. All the HEA hardware acceleration and protection are available for partition to partition communication.

To support the above flows, a convenient way to think is to picture a logical Layer 2 switch 902 and 904 to which all the logical ports associated to a given physical port as well as the physical port itself are attached. The issue is how and where this logical switch is implemented, alternatives span from a complete emulation in Firmware/Software to a complete implementation in the HEA hardware. There is one Logical Layer 2 switch per physical port; these logical switches are not connected together.

System Configurations

Virtualized HEA with Legacy OS TCP/IP Stacks

Figure 12:
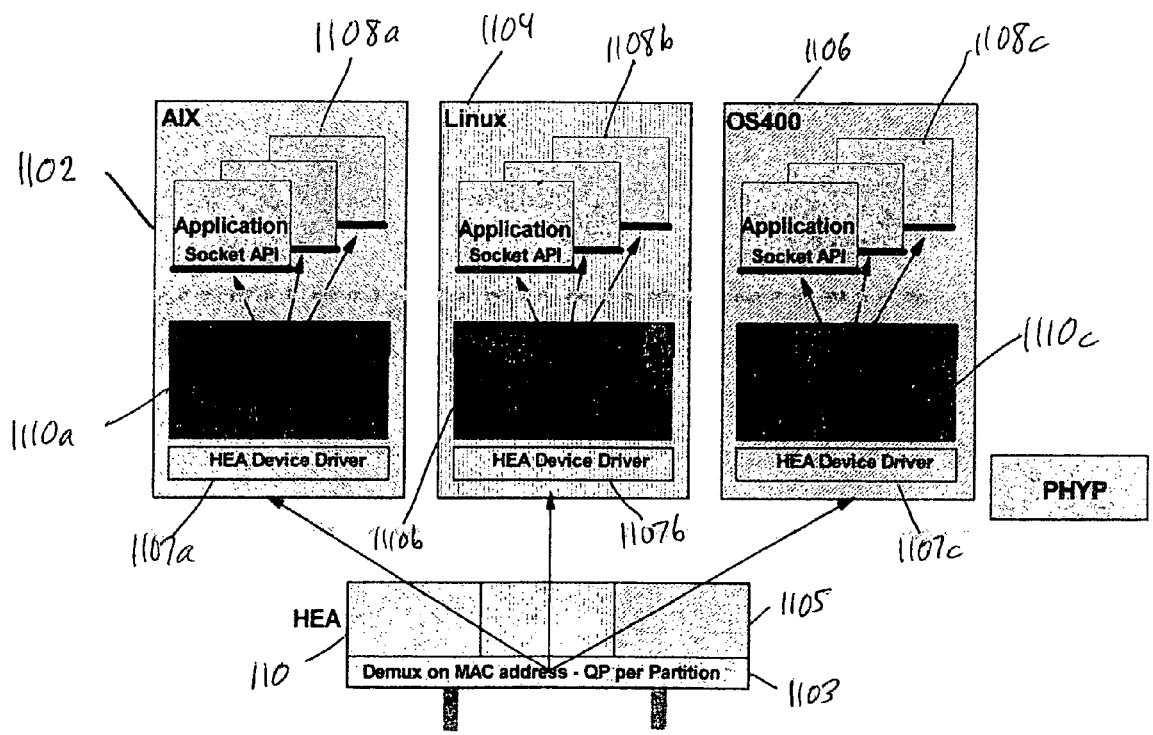
FIG. 12 shows the HEA used with Legacy OS TCP/IP stacks.

FIG. 12 shows the HEA used with a Legacy OS TCP/IP stacks 1102, 1104 and 1106.
Applications 1108a-1108c are unchanged
TCP/IP stacks 1102,1104 and 1106 are unchanged
Device Drivers 1107a, 1107b and 1107c supporting the HEA 110 are required
TCP/IP stack (OS) can be optionally enhanced to take advantage of features such as low latency queues for short packet or packets demultiplexing per TCP connection. As seen the demultiplexing of packets are performed based upon the MAC address and the QPN per partiton.

Virtualized HEA with Legacy OS Stacks and User Space TCP/IP

Figure 13:
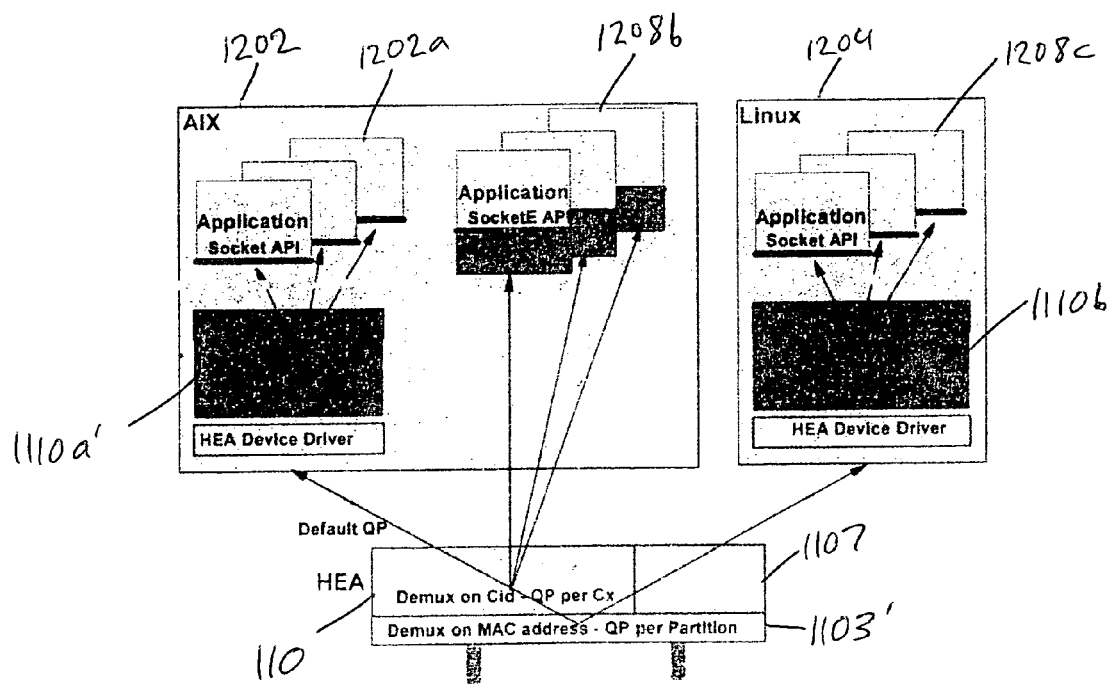
FIG. 13 shows the HEA used in a system where some partitions are supporting User Space TCP stacks.

FIG. 13 shows the HEA 110 used in a system where some partitions are supporting User Space TCP stacks 1220 as well as legacy OS stacks 108a and 1208b:
Applications supporting User Space TCP may be required to use Socket extensions API
Other partitions can use regular OS TCP/IP stack
Some applications in the partition supporting Used Space TCP can also use the regular TCP/IP stack (default path). The User Space TCP1220 is demultiplexed by the HEA 119 base upon customer identification (Cid)information and the QPN for the customer.
The logical switch is completely supported in the adapter. To minimize the HEA hardware complexity, the HEA relies on a software entity, the Multicast manager, for Multicast/ Broadcast packet replication. HEA provides assist to the Multicast manager to deliver packet copies to the destination partitions.

External Unicast Traffic

Transmit unicast traffic is handled through QPs allocated to the partitions. It an be a dedicated queue pair per connection or a single queue pair per logical port or both. Fair scheduling among the Send queues is provided by the HEA. Depending upon system configuration, the QP access can be granted to the application (User space) or only to the OS stack (Privileged).
Received unicast traffic is demultiplexed as follows:
Look Up is performed on the destination MAC address to find the destination logical port
If per connection queueing is enabled for the destination logical port, a second Look Up is performed on the connection ID to find the QP associated with the connection
If either per connection queueing is not enabled or the connection QP has not been set up for a particular connection, the incoming message is queued to the "default" QP associated with the destination logical port.

Partition to Partition Unicast Traffic

Figure 14:
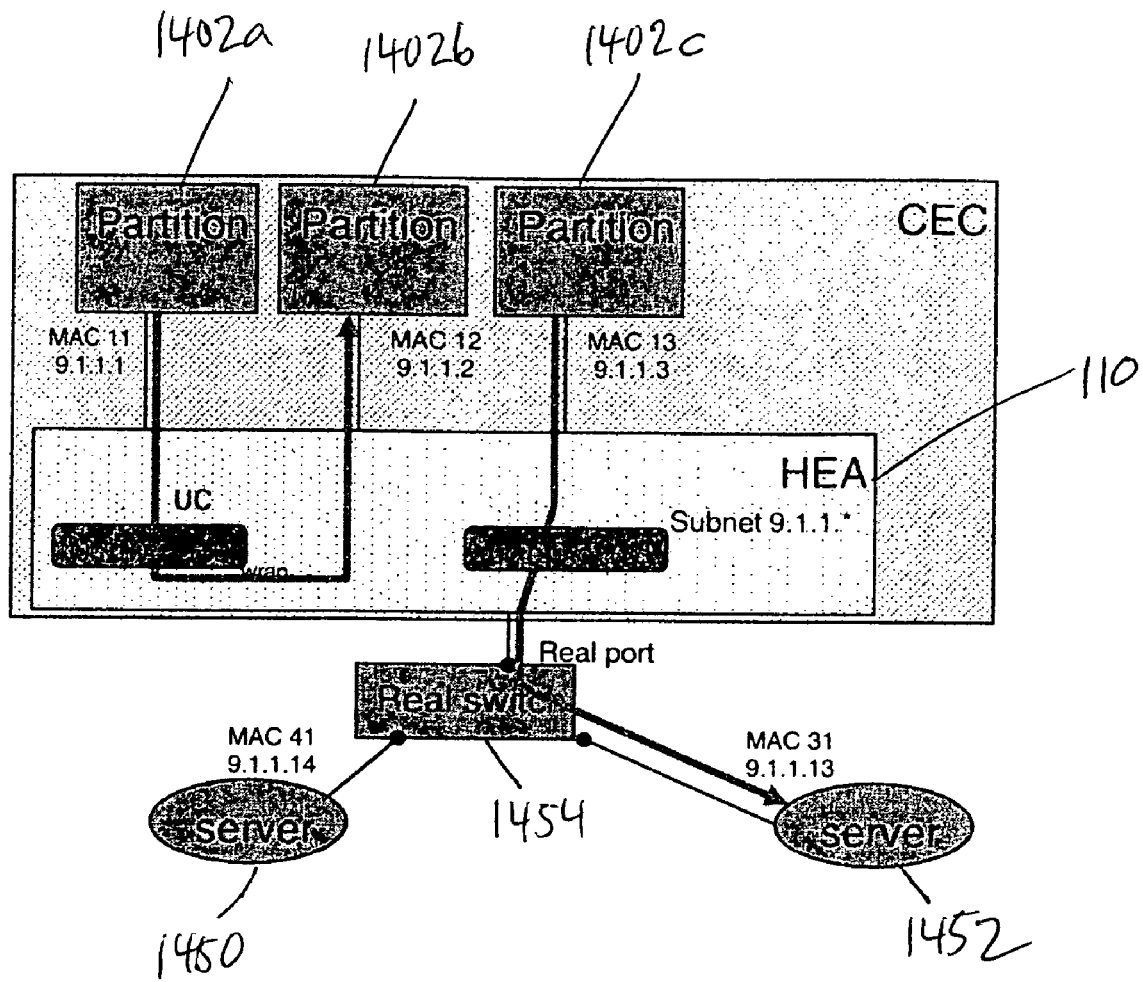
FIG. 14 illustrates all the HEA supporting acceleration features including per connection queueing.

FIG. 14 is a block diagram that illustrates all the HEA acceleration features including per connection queueing are supported. Full transparency is offered to the partition's device drivers.

The partition stack uses either the per connection QPs or default QP to transmit a packet. As the packet is processed by the HEA transmit side, the HEA detects that the destination MAC address is a MAC address associated to a logical port defined on the same physical port (in other words the destination MAC address identifies a receiving logical link belonging to the same Layer 2 Logical Switch than the transmit logical link). Therefore, the HEA wraps the packet. The HEA receive side then processes the packet as if it was received from the physical link and therefore the exact same acceleration features are used.

In the IP case, the IP stack can use regular mechanism to find out the destination MAC address of a destination partition located on the same IP subnet. This partition can be collocated on the same server or not, this is transparent for both the stack and device drivers.

External and Partition to Partition Multicast/Broadcast Traffic

The HEA has no provision for replicating multicast and broadcast packets to the interested partitions. Instead, it forwards all received MC/BC packets to QP owned by a Multicast Manager function. This function replicates the packets as required and uses the HEA transport capabilities to distribute the copies to the interested partitions.

Receive

Figure 15:
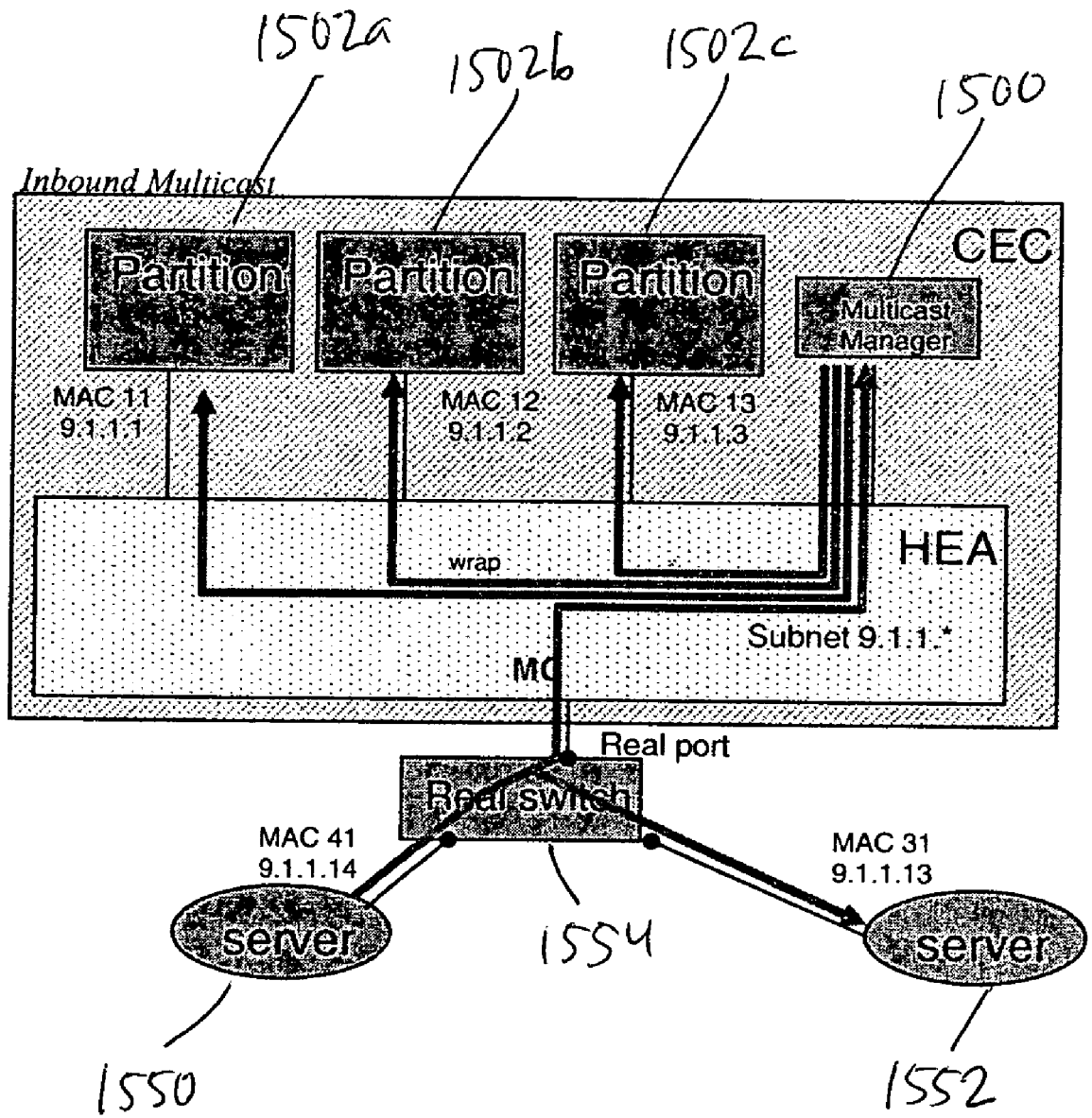
FIG. 15 illustrates inbound multicast transmission.

FIG. 15 illustrates inbound multicast transmission. Received Multicast and Broadcast packets go first through an HEA filtering function. If not discarded, the packet is directed to the QP owned by the Multicast Manager 1500. The packet is transferred to the system memory and Multicast Manager 1500 is activated. The Multicast Manager 1500 determines which logical ports should receive a copy of the packet (Multicast filtering) and handles packet replication. The Multicast Manager can use the HEA 110 facilities to redistribute the packet to the recipient partitions 1502a-1502c.

To do so the Multicast Manager enqueues n—number of recipients—descriptors (WQE) referencing the received packet into its Send Queue. Note that the packet must be sent intact to its recipients, in particular it is not acceptable to replace the multicast destination MAC address by the unicast address of its various recipients. Therefore, the packet descriptor must contain information so that the HEA can direct the packet to its proper destination. This information can be either the default QP of the recipient or its logical port ID or its MAC address. Once the packet is selected to be sent, the HEA transmit side determines thanks to information contained in both the QP and the WQE that the packet needs to be sent over the wrap. Along with the data, information to determine the recipient QP is transferred to the HEA receive side. HEA receive side uses this information to enqueue the packet to the recipient QP.

Transmit

Figure 16:
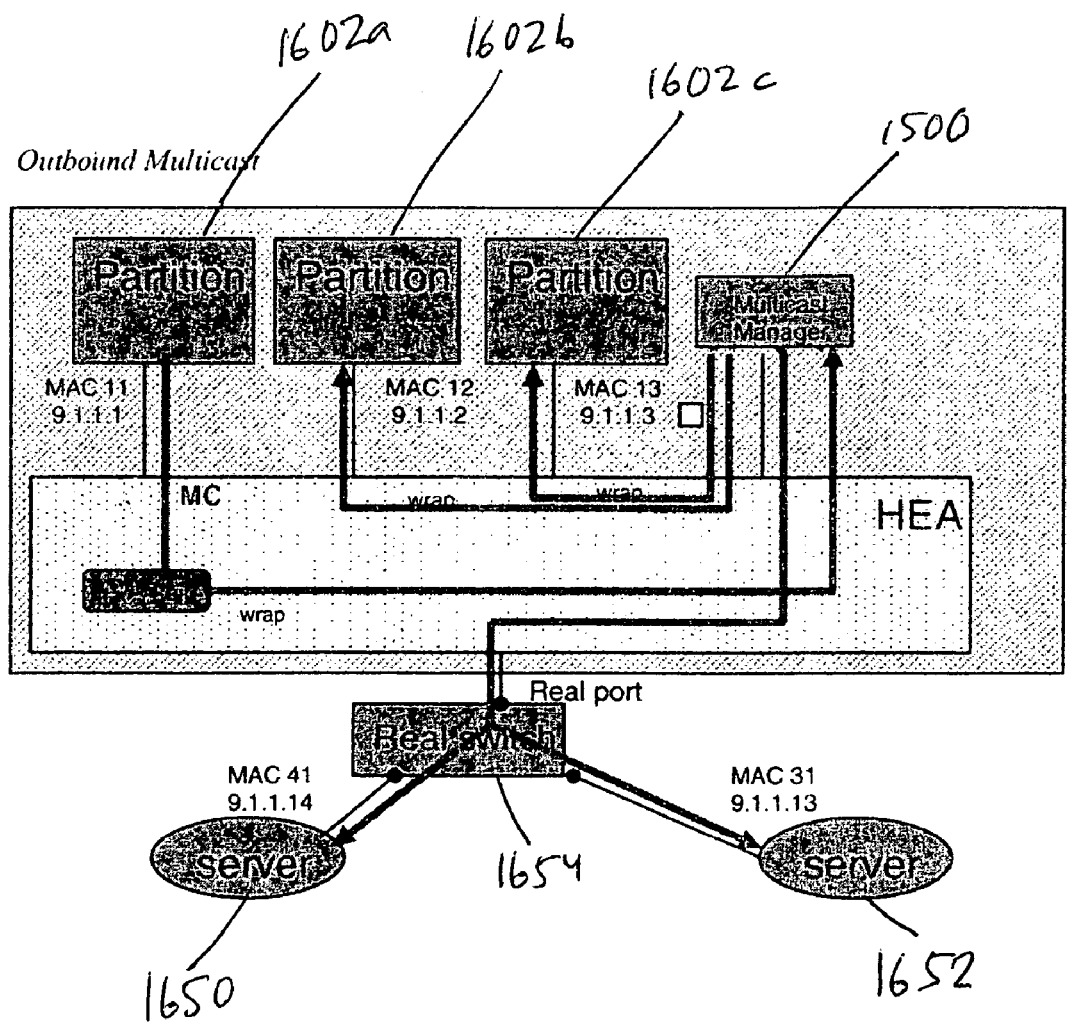
FIG. 16 illustrates outbound multicast transmission.

FIG. 16 illustrates outbound multicast transmission. Broadcast/Multicast packets are transmitted using the normal procedures by originating partitions. As the packet is processed by the HEA transmit side, the HEA detects that the destination MAC address is broadcast or multicast and that the "Force_Out" option is not set in the WQE. The HEA therefore wraps the packet. The HEA received side then processes the packet as described above. The Multicast manager processes the packet as described above with the following additions:

- It must ensure that the sender is removed from the list of recipients, it does to using the source MAC address of the packet as a filter.
- VLAN filtering may be performed during the packet replication process. Packets will only be sent to members of the VLAN.
- Once the internal replication has taken place, the packet must be sent out the physical port. It does so by enabling the force out function of its QP and setting the "Force out" bit in the WQE. When this bit is set, the HEA sends directly the packet out on the physical link.

Multicast Filtering in Multipartitions Environment

On the receive side, the HEA provides Multicast filtering. The HEA like other "off the shelf" adapters provides best effort filtering based on a hash value of the destination MAC address and lookup into one filtering table per physical port. The intent of this function is to limit the multicast traffic, but the "final" filtering is left to the stack. In case of multipartitions, the filtering requirements from all the involved partitions should be merged by the Multicast manager, then configured in the HEA.

The Multicast manager can then do the multicast filtering per partition when handling the packet distribution to the interested partitions.

Packet Header Separation

The HEA 110 is capable of separating the TCP/IP header from the data payload. This feature enables zero-copy operations and therefore improves latency.

Packet header separation is performed by the HEA 110 when configured in the QP context. When configured, an Ethernet/IP/TCP or Ethernet/IP/UDP header is separated from the body of the packet and placed in different memory. Normally, the TCP/IP stack processes the header and the application processes the body. Separation in hardware allows to align user data into the user buffer thus avoiding copies.

The PFC 404 within the layer 204 (FIG. 8) passes the total header length (8 bits) to the RPP 606 of the host interface 206 (FIG. 10) indicating the number of bytes of Ethernet, IP and TCP/UDP header. The header length is set to 0 when there is no header split performed.

The QP must be configured for two or more receive queries (RQs).

If the packet is TCP or UDP (header length not zero), the RPP 606 places the header into the RQ1 WQE. The RPP 606 then chooses an appropriate RQ for the data part of the packet (RQ2 or RQ3). The descriptors in the RQ2 or RQ3 WQE are used to place the remaining data. The RPP 606 indicates that a CQE should be generated with the complete information. The header split flag is set. The correlator in the correlator field of the CQE is copied from the RQ2 or RQ3 WQE used. The count of header bytes placed in the first WQE is also put in the CQE.

If the header is larger than the available space in the RQ1 WQE, then the WQE is filled with as much data as possible and the Header Too Long flag is set in the CQE. The remainder of the header is placed with the data in the RQ2/RQ3 WQE.

When header split mode is set to ALL and header split is being performed (header length is non-zero), none of the body of the packet is ever placed in the RQ1 WQE. A QP may optionally be configured to place short packets entirely into the RQ1 WQE (header split mode=ML). If configured as such, if the packet length is less than the RQ2 Threshold, then only a RQ1 WQE is used and header separation is not performed. Note that the body is never split between RQ1 and RQ2/RQ3.

If the packet is an IP fragment or is not TCP or UDP (header length is zero) and the packet was too large to fit in the RQ1 WQE, then the entire packet is placed using the RQ2 or RQ3 WQE. The header count is set to zero. The header split flag is off. A RQ1 WQE is not consumed (unless competition information is to be placed in the RQ1 WQE).

Accordingly the HEA 110 is capable of separating the TCP/IP header from the data payload. This feature allows the header to be directed to the protocol stack for processing without polluting the received buffers posted by the applications and therefore reduces the latency period for certain transactions.

SUMMARY

Accordingly, a Host Ethernet Adapter (HEA) in accordance with the present invention achieves unmatched performance level by being directly connected to the private bus of the processor and therefore having sufficient bandwidth (for example 55.42 Gbps at 866 MHz) to support the full 40 Gbps bandwidth of two 10 Gbps ports. By having the adapter on the private bus of the processor also removes intermediate logic and therefore improves transfer latency. Accordingly, a network interface controller (NIC) can be provided utilizing the HEA 110 which allows for higher speeds, lower latency and simpler logic than in conventional NICs.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An Ethernet adapter providing direct data and control paths between using partitions and the adapter, the adapter comprising:
   an architecture for allowing the adapter to receive and transmit packets from and to a processor; the architecture including: a demultiplexing mechanism to allow for partitioning of the processor and a plurality of layers including:
   a media access controller and serialization / deserialization (MAC and Serdes) layer having same chip input/outputs (I/Os) providing a plurality of interfaces from and to one or more devices on a network;
   a packet acceleration and virtualization layer,
      for receiving packets from and providing packets to the MAC and Serdes layer, including demultiplexing packets for enabling virtualization or partitioning an operating system (OS) in relation to the packets, and
      for providing packet header separation by separating as appropriate the packet header from a data payload by removing the header from the body of the packet and directing the header to a protocol stack for processing without polluting received buffers thereby reducing into a latency period for certain transactions; and,
   a host interface layer providing for context management, for communicating with the packet accelerator and virtualization layer and for interfacing and directly interacting with a private bus of the processor;
   wherein one logical switch is utilized for each physical port of the adapter and wherein each logical port has a separate port on a logic switch, wherein one logical switch provides a plurality of logical ports wherein each of the plurality of logical ports supports a partition of the processor, and wherein partition to partition communication is enabled.

2. The Ethernet adapter of claim 1 wherein the demultiplexing mechanism allows for a direct path to a plurality of operating systems to be utilized within the processor.

3. The Ethernet adapter of claim 1 wherein the demultiplexing mechanism allows for a plurality of applications to be utilized within the processor.

4. The Ethernet adapter of claim 1 wherein the demultiplexing mechanism allows for a plurality of operating systems to be utilized within the processor and for a plurality of applications to be utilized within the processor.

5. The Ethernet adapter of claim 1 wherein the MAC and Serdes layer further comprises a receive Ethernet function for receiving packets; and a transmit Ethernet function for transmitting packets.

6. A network interface card (NIC) comprising:
   an interface adapted to be coupled to a private bus of a processor; and
   an Ethernet adapter providing direct data and control paths between using partitions and the adapter, the adapter having an architecture for allowing the adapter to receive and transmit packets from and to a processor; the architecture including: a demultiplexing mechanism to allow for partitioning of the processor and a plurality of layers including:
   a media access controller and serialization / deserialization (MAC and Serdes) layer having same chip input/outputs (I/Os) providing a plurality of interfaces from and to one or more devices on a network;
   a packet acceleration and virtualization layer,
      for receiving packets from and providing packets to the MAC and Serdes layer, including demultiplexing packets for enabling virtualization or partitioning an operating system (OS) in relation to the packets, and
      for providing packet header separation by separating as appropriate the packet header from a data payload by removing the header from the body of the packet and directing the header to a protocol stack for processing without polluting received buffers thereby reducing into a latency period for certain transactions;
   a host interface layer providing for context management, for communicating with the packet accelerator and virtualization layer and for interfacing and directly interacting with the private bus of the processor;
   wherein one logical switch is utilized for each physical port of the adapter and wherein each logical port has a separate port on a logic switch, wherein one logical switch provides a plurality of logical ports wherein each of the plurality of logical ports supports a partition of the processor, and wherein partition to partition communication is enabled.

7. The NIC of claim 6 wherein the demultiplexing mechanism allows for a direct path to a plurality of operating systems to be utilized within the processor.

8. The NIC of claim 6 wherein the demultiplexing mechanism allows for a plurality of applications to be utilized within the processor.

9. The NIC of claim 6 wherein the demultiplexing mechanism allows for a plurality of operating systems to be utilized within the processor and for a plurality of applications to be utilized within the processor.

10. The NIC of claim 6 wherein the MAC and Serdes layer further comprises a receive Ethernet function for receiving packets; and a transmit Ethernet function for transmitting packets.

11. A server system comprising:
    a server,
    the server including a processor and a memory coupled to the processor; and
    a network interface card (NIC) coupled to the processor via a private bus of the processor; the NIC further including an Ethernet adapter coupled to the private bus via a private bus interface,
       the Ethernet adapter providing direct data and control paths between using partitions and the adapter, the adapter comprising an architecture for allowing the adapter to receive and transmit packets from and to the processor; the architecture including: a demultiplexing mechanism to allow for partitioning of the processor and a plurality of layers including:

a media access controller and serialization / deserialization (MAC and Serdes) layer having same chip input/outputs (I/Os) providing a plurality of interfaces from and to one or more devices on a network;

a packet acceleration and virtualization layer, for receiving packets from and providing packets to the MAC and Serdes layer, including demultiplexing packets for enabling virtualization or partitioning an operating system (OS) in relation to the packets, and for providing packet header separation by separating as appropriate the packet header from a data payload by removing the header from the body of the packet and directing the header to a protocol stack for processing without polluting received buffers thereby reducing into a latency period for certain transactions; and, a host interface layer providing for context management, for communicating with the packet accelerator and virtualization layer and for interfacing and directly interacting with the private bus of the processors;

wherein one logical switch is utilized for each physical port of the adapter and wherein each logical port has a separate port on a logic switch, wherein one logical switch provides a plurality of logical ports wherein each of the plurality of logical ports supports a partition of the processor, and wherein partition to partition communication is enabled.

12. The server system of claim 11 wherein the demultiplexing mechanism allows for a direct path to a plurality of operating systems to be utilized within the processor.

13. The server system of claim 11 wherein the demultiplexing mechanism allows for a plurality of applications to be utilized within the processor.

14. The server system of claim 11 wherein the demultiplexing mechanism allows for a plurality of operating systems to be utilized within the processor and for a plurality of applications to be utilized within the processor.

15. The server system of claim 11 wherein the MAC and Serdes layer further comprises a receive Ethernet function for receiving packets; and a transmit Ethernet function for transmitting packets.

* * * * *

UNITED STATES PATENT AND TRADEMARK OFFICE
CERTIFICATE OF CORRECTION

PATENT NO. : 7,586,936 B2  Page 1 of 1
APPLICATION NO. : 11/097608
DATED : September 8, 2009
INVENTOR(S) : Arimilli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 712 days.

Signed and Sealed this

Twenty-first Day of September, 2010

David J. Kappos
*Director of the United States Patent and Trademark Office*